United States Patent [19]

Koike

[11] 4,232,963

[45] Nov. 11, 1980

[54] DEVICE FOR POSITIONING MOVABLE REFLECTOR OF OPTICAL SYSTEM OF ELECTROPHOTOGRAPHIC COPYING APPARATUS

[75] Inventor: Tadao Koike, Tokyo, Japan

[73] Assignee: Ricoh Company, Ltd., Japan

[21] Appl. No.: 16,722

[22] Filed: Mar. 2, 1979

[30] Foreign Application Priority Data

Mar. 6, 1978 [JP] Japan ........................... 53/27427[U]

[51] Int. Cl.$^3$ ............................................ G03B 27/48

[52] U.S. Cl. .................................................... 355/49

[58] Field of Search ................................... 355/46–51, 355/57, 60, 66, 8, 11

[56] References Cited

U.S. PATENT DOCUMENTS

| | | | |
|---|---|---|---|
| 2,845,841 | 8/1958 | Collins | 355/51 |
| 3,625,606 | 12/1971 | Rosenberg et al. | 355/46 |
| 4,015,892 | 4/1977 | Tabata | 355/66 X |
| 4,077,714 | 3/1978 | Komori et al. | 355/51 |

FOREIGN PATENT DOCUMENTS

| | | | |
|---|---|---|---|
| 1569107 | 4/1969 | France | 355/11 |

*Primary Examiner*—Donald A. Griffin
*Attorney, Agent, or Firm*—McGlew and Tuttle

[57] ABSTRACT

A device for positioning a movable reflector of an optical system of an electrophotographic copying apparatus for forming an optical image of an original on a photosensitive member is disclosed wherein the movable reflector is secured to a reference plate supported by a bracket pivotally mounted on a housing which has a plurality of positioning stoppers. The reference plate supporting the reflector has a plurality of reference surfaces. Contact is made between each of the surfaces and a corresponding one of the positioning stoppers in a predetermined position. Plate springs are mounted between the reference plate and the bracket so as to absorb shock which is produced when the reference surfaces on the reference plate are brought into contact with the respective positioning stoppers. The plate springs further perform the function of positively forcing the reference surfaces on the reference plate against the respective positioning stoppers.

2 Claims, 4 Drawing Figures

DEVICE FOR POSITIONING MOVABLE REFLECTOR OF OPTICAL SYSTEM OF ELECTROPHOTOGRAPHIC COPYING APPARATUS

BACKGROUND OF THE INVENTION

This invention relates to a device for positioning the movable reflector of an optical system of an electrophotographic copying apparatus capable of producing copies of an original by varying the size thereof.

In one type of electrophotographic copying apparatus known in the art and capable of producing copies by varying the size thereof, switching to the optical system from one magnification mode to another is effected by moving the lens and alternately using the reflector for producing copies of one magnification mode and the reflector for producing copies of another magnification mode. When the reflector for producing copies distinct in size from the original is not used, it is necessary to move it from the optical path because it blocks the optical path for the reflector for producing copies of the same size as the original. In moving the reflector from the optical path and back into the optical path again, it is necessary to position the reflector accurately in the optical path. Difficulties have hitherto been experienced in accurately positioning the reflector, in view of the precision with which the parts are finished and the skill required in assembling these parts.

SUMMARY OF THE INVENTION

This invention has as its primary object the provision of a device for positioning a movable reflector of an optical system of an electrophotographic copying apparatus capable of positioning the movable reflector accurately and readily, irrespective of the finishes given to the parts and the precision with which the parts are assembled.

According to the invention, there is provided a device for positioning a movable reflector of an optical system of an electrophotographic apparatus. The apparatus includes a lens and a plurality of reflectors, one reflector being movable between an operative position in which it is disposed in an optical path and an inoperative position in which it is out of the optical path. The apparatus comprises a reference plate for securing the movable reflector to it, a bracket supporting the reference plate and pivotally mounted on a housing, a plurality of positioning stoppers on the housing for positioning the movable reflector, and a plurality of reference surfaces on the reference plate. Each of the reference surfaces is brought into contact with one of the positioning stoppers in a predetermined position.

Other and additional objects, features and advantages of the invention will become apparent from the description set forth hereinafter when considered in conjunction with the accompanying drawings.

DESCRIPTION OF THE PREFERRED EMBODIMENT

Figure 1:
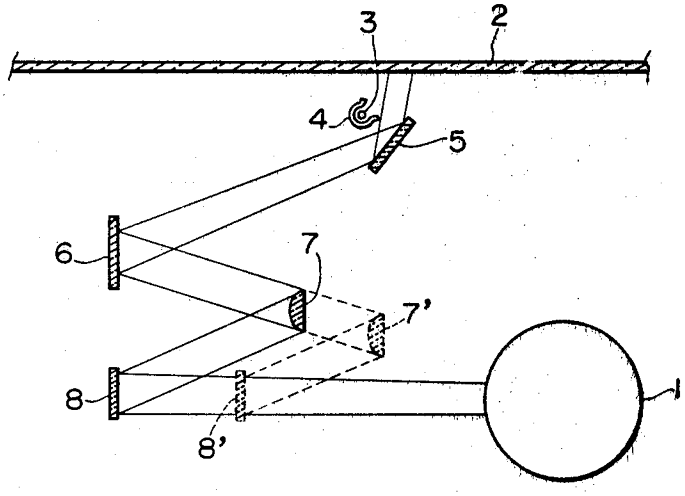
FIG. 1 is a schematic view of the optical system of a copying apparatus in which the present invention can be incorporated.

The preferred embodiment of the invention will now be described by referring to the drawings. In FIG. 1, an original to be copied is placed on a contact glass plate 2 serving as an original placing surface and irradiated by an irradiation lamp 3 and a lamp reflector 4. The light reflected by the original is reflected by a first reflector 5 and a second reflector 6 and incident on a lens 7. After passing through the lens 7, the light is reflected by a third reflector 8 to expose a photosensitive drum 1 to an optical image of the original.

The optical system of a copying apparatus usually produces a copy of a size which is equal to that of the original. The optical system for producing copies of the same size as the original is shown in solid lines in FIG. 1. If it is desired to produce copies different in size from the original by using this copying apparatus, an alternative optical path shown in broken lines in FIG. 1 should be provided. A fourth reflector 8' arranged on the alternative optical path would obstruct the normal optical path to the photosensitive drum 1 which is formed when a copy of the same size as the original is to be produced and in which the third reflector 8 is disposed. This makes it necessary to move the fourth reflector 8' from its operative position in the optical path to its inoperative position out of the optical path.

Also, when a copy of a size different from that of the original is produced, the lens 7 should be moved by some means. When separate in-mirror lenses 7 and 7' are used for producing copies of the same sizes as the original and copies of a size different from that of the original, respectively, the in-mirror lens 7 for producing copies of the same size as the original should be moved in order not to obstruct the optical path of the lens 7'. Therefore, when the fourth reflector 8' and the in-mirror lens 7 are moved, they should be moved in conjunction with each other. In this connection, it is essential to position the fourth reflector 8' accurately in the optical path in order to obtain a copy of a clear image.

Figure 2A:
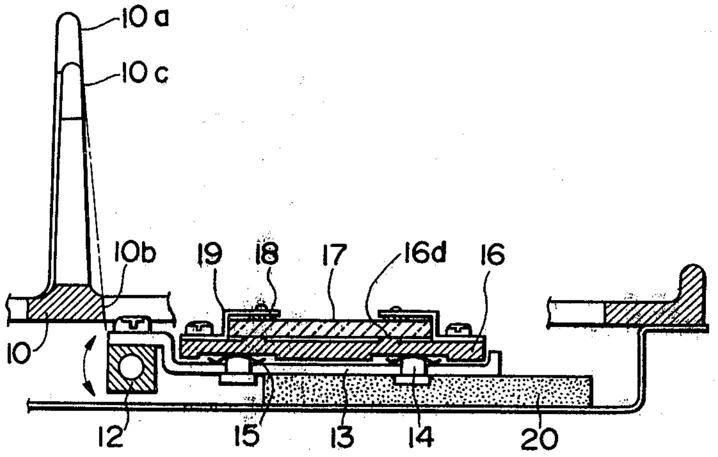
FIGS. 2(A) and 2(B) are vertical sectional views showing the operation of the device according to the invention.
Figure 2B:
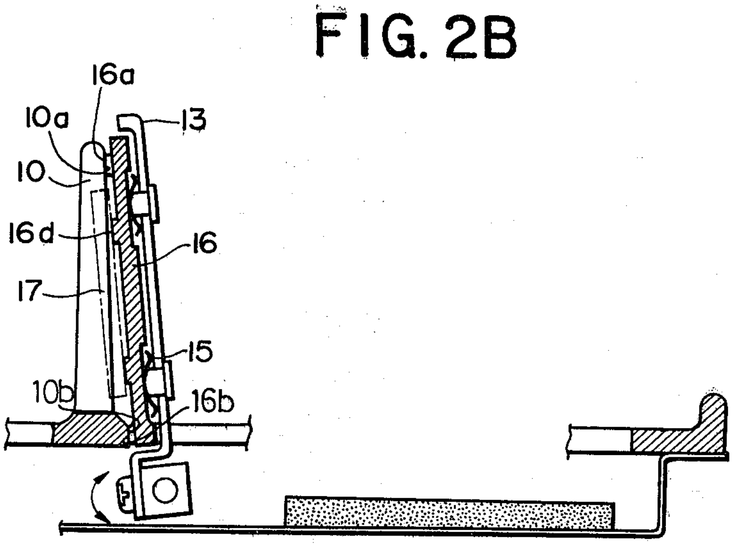
Figure 3:
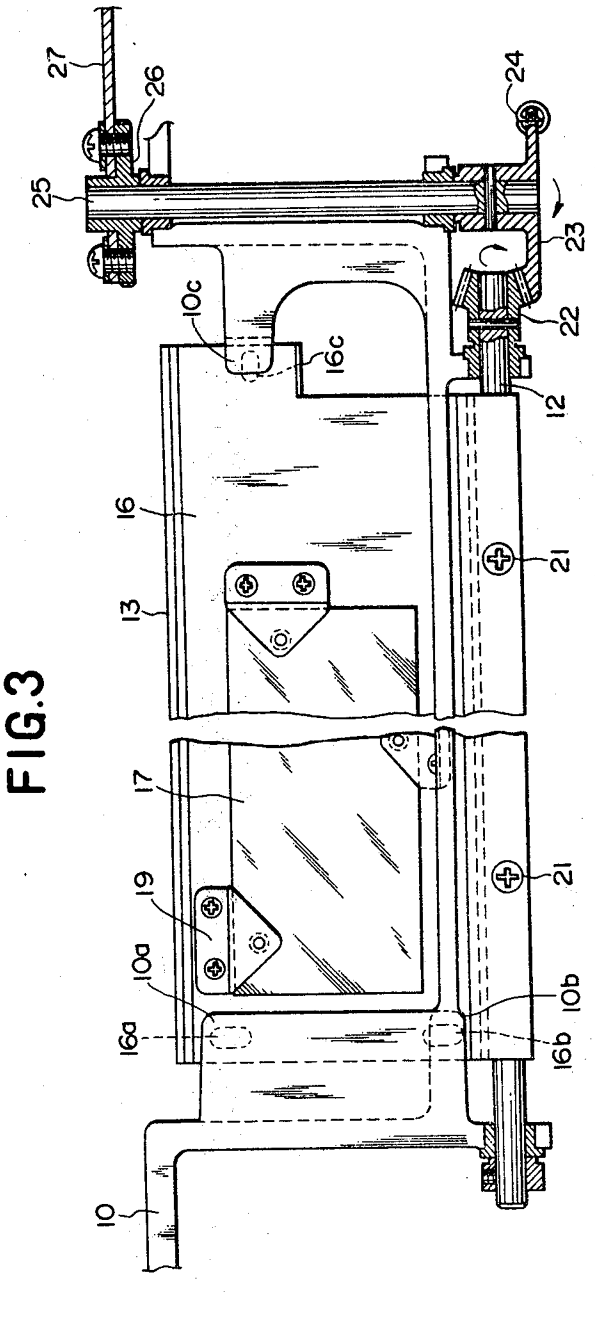
FIG. 3 is a plan view of the device according to the invention.

Referring to FIGS. 2(A) and 2(B) and 3, a reflector 17 is placed on reference surface **16*d* of a reference plate 16 and secured in position by brackets 19. Shock absorbers 18 are provided between the reflector 17 and each of the brackets 19**.

The reference plate 16 having the reflector 17 secured thereto is connected to a bracket 13 by pins 14, and plate springs 15 are mounted between the reference plate 16 and the bracket 13. The bracket 13 is secured by screws 21 to a portion of a rotary shaft 12 which is square in cross section, the rotary shaft 12 being rotatably supported by a housing 10.

A bevel gear 22 is secured by a pin to one end of the shaft 12 in meshing engagement with a segmental bevel gear 23 secured by a pin to a shaft 25 rotatably supported by the housing 10. The segmental bevel gear 24 has one end of a return spring 24 mounted on it, and the shaft 25 has a lever 27 secured to it by an adjusting knob 26. The lever 27 is operative to move in conjunction with the movement of lens of the optical system.

When the optical system is switched from production of copies of a size equal to that of the original to production of copies of a size different from that of the original, the lens 7 is moved and the lever 27 is moved in conjunction with the movement of the lens. Movement of the lever 27 causes the segmental bevel gear 23 to rotate against the biasing force of the return spring 24, thereby rotating the bevel gear 22 counterclockwise in FIG. 2(A). This moves the bracket 13 and reflector 17 from an inoperative position shown in FIG. 2(A), in which the reflector 17 is out of the optical path, to an operative position shown in FIG. 2(B) in which the reflector 17 is disposed in the optical path.

The housing 10 has stoppers 10*a*, 10*b* and 10*c* on it for positioning the reflector 17 when the latter is pivotally moved by rotating the shaft 12 about its axis. On the other hand, the reference plate 16 has reference surfaces 16*a*, 16*b* and 16*c* on it, and these surfaces are positioned against the respective stoppers 10*a*, 10*b* and 10*c* for positioning the reflector 17. Absorption of shock produced when the reference surfaces 16*a*, 16*b* and 16*c* of the reference plate 16 are brought into contact with the stoppers 10*a*, 10*b* and 10*c*, respectively, and ensuring pressing contact of the stoppers 10*a*, 10*b* and 10*c* against the reference surfaces 16*a*, 16*b* and 16*c*, respectively, are effected by the plate springs 15. In order to ensure that positioning of the reflector 17 is effected positively, the reference surfaces 16*a*, 16*b*, 16*c* and 16*d* are machined with a high degree of precision and to the same level as shown in FIGS. 2A and 2B.

When the bracket 13 has completed its pivotal movement and the reflector 17 has moved to its operative position, the plate springs 15 are deformed between the reference plate 16, which remains stationary in the position determined by the stoppers 10*a*, 10*b* and 10*c*, and the bracket 13 which slightly moves thereafter, so that the reference plate 16 is forced in a correct direction by the resilience of the plate springs 15 against the stoppers 10*a*, 10*b* and 10*c* of the housing 10, thereby completing setting of the reflector 17 in its operative position.

If a suitable degree of resilience is selected for the plate springs 15, there is no risk that the reflector 17 will be moved from its regular operative position when impact is applied to the reflector 17 due to an unforeseen accident during a copying operation.

When it is desired to switch the optical system from production of copies of a size different from that of the original to production of copies equal in size to the original, the lever 27 is pivotally moved in a direction opposite to the direction described hereinabove, so that the reflector 17 supported on the bracket 13 is moved to the inoperative position shown in FIG. 2(A) by its own weight and the biasing force of the return spring 14. When the reflector 17 is moved to its inoperative position, the back of the bracket 13 supporting the reflector 17 is brought into contact with a cushion 20 secured to the housing 10, so that the reflector 17 and other parts do not project into the optical path for producing copies of the same size as the original.

The back of the reflector 17 is preferably frosted or covered with black paper or other material so as to avoid the production of unnecessary reflected light when the optical path is formed for producing copies of the same size as the original. Adjustments of the manner in which the reflector 17 is brought into abutting engagement with the housing are effected by manipulating the adjusting knob 26 to alter the position in which the lever 27 stops in its pivotal movement.

From the foregoing description, it will be appreciated that in the present invention, the reference surfaces on the reference plate are positively brought into intimate contact with the positioning stoppers on the housing by virtue of elastic deformation of the resilient members interposed between the reference plate and the bracket. Thus, if the surfaces of the stoppers on the housing and the reference surfaces of the reference plate only have precision finishes, it is possible to position the movable deflector accurately in its predetermined position, although other parts may have ordinary finishes and the assembling of the parts may not be effected with precise care, because the resilient members absorb errors in assembling and eliminate influences that might otherwise be exerted on the assembled parts by tolerances provided in working and assembling the parts. Therefore, what is required is to ensure that the reference surfaces have precision finishes and assembling of the reflector is effected with a high degree of efficiency, so that working and assembling of parts can be effected efficiently and production cost can be reduced in fabricating a copying machine. By providing the housing with a plurality of bearings (movement guides) and reference surfaces, it is possible to readily alter the size of copies to be produced by the optical system, thereby increasing versatility of the copying machine.

What is claimed is:

1. A device for positioning a movable reflector having a reflection surface and of an optical system of an electrophotographic copying apparatus including a lens and a plurality of reflectors, at least one of said reflectors being movable between an operative position in which said movable reflector is disposed in an optical path and obstructs the normal optical path from another fixed reflector and in an inoperative position in which said movable reflector is out of the optical path, said device comprising:
   - a reference plate;
   - means for securing said movable reflector thereto;
   - a bracket supporting said reference plate;
   - a housing for said bracket;
   - means pivotally mounting said bracket on said housing;
   - a plurality of positioning stoppers on said housing for positioning said movable reflector; and
   - a plurality of reference surfaces on said reference plate, each of said reference surfaces being machined to the same level, some surfaces being in contact with the reflection surface of the reflector and each of the other surfaces being brought into contact with one of said positioning stoppers in a predetermined position when said reflector is in its operative position.

2. A device for positioning a movable reflector of an optical system of an electrophotographic copying apparatus including a lens and a plurality of reflectors, at least one of said reflectors being movable between an operative position in which said movable reflector is disposed in an optical path and an inoperative position in which said movable reflector is out of the optical path, said device comprising:
   - a reference plate;
   - means for securing said movable reflector thereto;
   - a bracket supporting said reference plate;
   - a housing for said bracket;
   - means pivotally mounting said bracket on said housing;
   - a plurality of positioning stoppers on said housing for positioning said movable reflector; and
   - a plurality of reference surfaces on said reference plate, each of said reference surfaces being brought into contact with one of said positioning stoppers in a predetermined position when said reflector is in its operative position, and
   - a plurality of plate springs mounted between said reference plate and said bracket for bringing the reference surfaces on the reference plate into resilient contact with the respective stoppers on the housing.

* * * * *